United States Patent
Tang et al.

(10) Patent No.: US 6,731,308 B1
(45) Date of Patent: May 4, 2004

(54) MECHANISM FOR RECIPROCAL AWARENESS OF INTENT TO INITIATE AND END INTERACTION AMONG REMOTE USERS

(75) Inventors: John C. Tang, Palo Alto, CA (US); Nicole Y. Mordecai, Weston, MA (US); James M. A. Begole, Mountain View, CA (US); Janak R. Bhalodia, Indio, CA (US); Max G. Van Kleek, Charlestown, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/521,486

(22) Filed: Mar. 9, 2000

(51) Int. Cl.[7] .................................................. G09G 5/00
(52) U.S. Cl. ........................ 345/751; 345/753; 345/756; 345/758
(58) Field of Search ................................ 345/751, 752, 345/753, 758, 759, 764

(56) References Cited

U.S. PATENT DOCUMENTS

| | | | | |
|---|---|---|---|---|
| 4,974,173 A | * | 11/1990 | Stefik et al. ................. | 345/751 |
| 5,107,443 A | * | 4/1992 | Smith et al. ................. | 345/751 |
| 5,659,692 A | * | 8/1997 | Poggio et al. ............... | 345/756 |
| 5,664,126 A | * | 9/1997 | Hirakawa et al. ........... | 345/751 |
| 5,793,365 A | | 8/1998 | Tang et al. .................. | 345/329 |
| 5,880,731 A | * | 3/1999 | Liles et al. .................. | 345/758 |
| 5,990,887 A | * | 11/1999 | Redpath et al. ............. | 345/758 |
| 6,014,135 A | * | 1/2000 | Fernandes .................... | 345/744 |
| 6,366,962 B1 | * | 4/2002 | Teibel ........................ | 709/245 |
| 6,415,020 B1 | * | 7/2002 | Pinard et al. ............. | 379/88.11 |
| 6,421,653 B1 | * | 7/2002 | May ............................ | 705/37 |
| 6,430,604 B1 | * | 8/2002 | Ogle et al. .................. | 709/207 |

FOREIGN PATENT DOCUMENTS

WO     WO 99/48011     9/1999

OTHER PUBLICATIONS

Dourish, Paul and Sara Bly "Portholes: Supporting Awareness in a Distributed Work Group" *Proceedings of the Conference on Computer Human Interaction May 3–7, 1992 (CHI)*, Monterey, California, pp. 541–547 (1992).

Greenberg, Saul "Peepholes: Low Cost Awareness of One's Community" *ACM SIGCHI Conference on Human Factors in Computing Systems, Apr. 13–18, 1996, Vancouver, BC Canada, Companion Proceedings*, pp. 206–207 (1996).

(List continued on next page.)

*Primary Examiner*—Kristine Kincaid
*Assistant Examiner*—Nhon Nguyen
(74) *Attorney, Agent, or Firm*—Lahive & Cockfield, LLP

(57) ABSTRACT

The present invention provides methods and systems for providing distributed parties reciprocal information regarding each other's activities. For example, the method of the invention provides selected information regarding the availability of an intended recipient to engage in a communication session with an initiator, and reciprocally informs the intended recipient of the initiator's access to such information. Further, the method of the invention can provide a signal to an intended recipient to indicate an initiator's intention to establish a communication session. Further, the method of the invention provides a signal to each party to indicate whether a communication session has been established. In another aspect, the invention provides a method for informing the participants in a communication session of a party's intention to terminate its participation in the session.

12 Claims, 17 Drawing Sheets

OTHER PUBLICATIONS

Isaacs, Ellen A. et al. "Piazza: A Desktop Environment Supporting Impromptu and Planned Interactions" *Proceedings of the Conference on Computer–Supported Cooperative Work (CSCW) 1996,* Cambridge, Massachusetts, pp. 315–324 (1996).

Marx, Matthew and Chris Schmandt "CLUES: Dynamic Personalized Message Filtering" *Proceedings of the Conference on Computer–Supported Cooperative Work (CSCW) 1996,* Cambridge, Massachusetts, pp. 113–121 (1996).

America Online, Inc. "AOL Instant Messenger(SM): New Windows AIM 4.3—Available Now" [online], Retrieved from the Internet on Nov. 21, 2000, [http://www.aol.com/aim/home.html].

ICQ, Inc. "An Introduction to ICQ. What is ICQ?" [online], Retrieved from the Internet on Nov. 21, 2000, [http://www.icq.com/products/whatisicq.html].

Yahoo! Inc. "Yahoo! Messenger: Instantly communicate with all of your online friends . . . " [online], Retrieved from the Internet Nov. 21, 2000, [http://messenger.yahoo.com].

Microsoft Corporation "MSN Messenger Service" [online], Retrieved from the Internet Nov. 21, 2000 [http://messenger.msn.com].

CMGion, a CMGi Company "PowWow Features & Benefits" [online], Retrieved from the Internet Nov. 21, 2000 [www.powwow.com/powwow/features.cfm].

Bradner, Erin et al. "The Adoption and Use of 'Babble': A Field Study of Chat in the Workplace" *Sixth European Conference on Computer Supported Cooperative Work (ECSCW '99),* Copenhagen, Denmark Sep. 12–16, 1999, Proceedings, pp. 139–158.

\* cited by examiner

MECHANISM FOR RECIPROCAL AWARENESS OF INTENT TO INITIATE AND END INTERACTION AMONG REMOTE USERS

BACKGROUND OF THE INVENTION

The present invention relates to computer-implemented methods and systems for providing reciprocal information to two or more users of a set of interconnected computers regarding each other's selected activities. More particularly, the present invention provides visual cues to inform a user of another user's intention to initiate a contact or to end such a contact.

In the physical world, people employ a wide array of verbal and non-verbal cues to inform each other of their intentions to initiate a contact, e.g., start a conversation, or to terminate a contact, e.g., end a conversation. Further, in the physical world a person can assess another person's visual cues (e.g., facial expressions) or conditions (e.g., whether the person is engaged in a telephone conversation) to decide whether it is a proper time to initiate a contact with the other person. The availability of such reciprocal cues in the physical world allows a person to smoothly negotiate various interactions with other people.

People who work in close proximity of each other (such as the same building or site) employ reciprocal awareness of each other's activities to gauge whether to initiate a contact with a co-worker. For instance, a person working in an office may detect a co-worker approaching the office from a hallway and may be able to predict that the co-worker intends to initiate a conversation. Further, the person may be able to predict, based on prior familiarity with the co-worker and/or visual cues, the kind of conversation the co-worker intends to initiate. During the co-worker's approach, the person can react in various ways to indicate to the co-worker whether she is available for interaction. For example the person can turn her head toward the doorway to acknowledge the co-worker's approach, thereby inviting a conversation. Alternatively, the person can intensify her focus on her current task, to dissuade the co-worker from interrupting her.

Likewise, the co-worker can choose a course of conduct based on visual cues that he receives from the person that he intends to contact. For example, if the person is engaged in a telephone conversation, or if the person has a visitor in her office, the co-worker may decide that it is not an opportune time to make the contact. Further, such reciprocal awareness between the parties allows them to negotiate access and control privacy. For instance, a person can provide a signal (such as closing the office door) to a co-worker who is standing outside her office and monitoring her activity to indicate that she is aware of the co-worker's presence, and wishes the co-worker to leave. Additionally, a person who is aware of being monitored by a co-worker can control the information that the co-worker receives.

A similar process occurs when two parties intend to terminate an interaction. In particular, parties tend to give each other mutually shared non-verbal indications of an intent to end a conversation. For example, as a conversation begins to wind down, one of the parties may glance at her watch, take steps toward a doorway, or provide other cues of her intention to terminate the conversation. Further, after the termination of the conversation, one or both of the parties can restart the conversation, for example to convey a last-minute thought without much effort.

Among distributed participants (i.e., remotely situated) in a conversation, however, there is no reciprocal awareness of any participant's non-verbal cues of an intent to start and/or end an interaction. Thus, such distributed participants need to develop explicit, formal mechanisms for initiating and/or ending a contact. For example, before engaging in a telephone conversation, the phone must first ring to provide an explicit indication of one party's intent to initiate a contact, and the receiving party must explicitly answer the phone. In addition, there is generally some explicit exchange of identities (e.g. "Hi, this is Bob"). Similarly, the parties typically exchange an explicit "goodbye" before hanging up the phone, thereby terminating the telephone conversation.

Similarly, the interactions among distributed users of an interconnected set of computers can lack visual cues regarding each participant's intention to begin and/or to end an interaction. For example, in current instant messenger (IM) systems, an initiating user can initiate an IM contact with a receiver by popping up a window on the receiver's computer. The receiver, however, has no awareness that a contact from the initiating user is imminent, and reciprocally, the initiating user has no knowledge of whether the receiver is attending to the IM. For example, the initiator does not know whether a lack of response from the receiver is because the receiver is in the process of composing an answer or because the receiver is ignoring the IM.

Similarly, ending a contact in current IM systems tends to be awkward and can result in a premature disconnection of the communication link between the parties. For example, in some IM systems, one user can close an IM window to end a conversation without the other user knowing that the IM window has been closed. Thus, IM conversations in such systems require an explicit exchange of farewells before termination A number of systems that attempt to address the shortcomings of IM systems are known. For example, one system provides each computer of a set of users with a digital camera. A user of the system obtains periodic snap-shots of the offices of selected participants from the digital cameras. Thus, the user has a matrix of snap-shots composed of the images from the offices of the selected participants. This matrix of snap-shots allows the user to decide whether to initiate a contact with another participant. Such a system, however, has privacy issues, and further such a system requires that each participant have a digital camera and ancillary equipment.

Another system, known as "Gallery", is described in U.S. Pat. No. 5,793,365. Gallery provides each user with iconic pictures of other users. Each iconic picture can represent three different states: a first indicating that the user is actively working on the computer, a second indicating that the computer keyboard has been idle more than a few minutes, and a third indicating that the person is engaged in a computer-mediated communication, such as a desk-top video conference. Gallery provides only three distinguishable states of each user to the other users. Further, Gallery requires that three distinct iconic images of each user be created and stored.

A research project known as "Peepholes", which is described in a paper entitled "Low Cost Awareness of One's Community", published in ACM SIGCHI '96 Proceedings of Conference on Human Factors in Computing Systems (1996), offers a similar functionality to that offered by Gallery. "Peepholes" provides line drawings of each user rather than an iconic image. Further, Peepholes provides more than three states for indicating the activity of a user.

One disadvantage of Peepholes is that the representations of the users occupy a large portion of a user's computer screen which is traditionally viewed as valuable real estate that users are reluctant to give up. In addition, Peepholes uses a name label to associate a line drawing with that user, further aggravating the crowding of the user's computer screen.

Some researchers have suggested employing physical objects to which sensors are attached to be interfaced with computers of distributed users to provide mutual awareness among the users. For example, one research approach employs a first doll to represent a user and a second doll to represent a co-worker of the user. The user may turn the first doll representing herself toward the second doll representing the co-worker to indicate her intention to contact the co-worker. The user's computer detects the juxtaposition of the dolls and sends a signal to the co-worker's computer to inform the co-worker of the user's intention to make contact. Such a system requires explicit action by a user to convey an intention to communicate with another user. Further, such a system requires specialized peripherals, such as sensors and computer-controlled objects, to be interfaced with each user's computer.

SUMMARY OF THE INVENTION

A communication link, as used herein, refers to a connection between at least two parties that allows each party to transmit information to the other party. A communication link is used to establish a communication session, which is more formally defined below. Once a communication link has been established and a request for interaction among at least two parties has been accepted, a communication session is established. A communication link can be provided by a physical connection, for example by employing wire, optical fiber, etc. Alternatively, a communication link can be provided by wireless techniques. Further, a communication link employed with the present invention is not limited to the use of any particular protocol. For example, various network protocols (e.g., token ring) for linking two or more computers can be employed.

A communication session, as used herein, is established between at least two parties when a party requests establishing a communication session with another party by initiating a communication link and the other party accepts the request and actively attends to the information received from the initiating party through the established communication link. With a communication session, there is mutual engagement of the parties and there is interactivity among the parties.

The present invention provides a method for providing information to an initiator regarding availability of an intended recipient for engaging in a communication session. The method is especially well-adapted for use with instant messaging. In particular, in one embodiment of the present invention, the initiator is provided with a visual representation of the intended recipient. The visual representation conveys information regarding the availability of the intended recipient. The visual representation can be a handle, such as a textual handle, a graphical handle, or a combination thereof. For example, the visual representation can inform the initiator that the recipient is engaged in a telephone conversation and hence provide a cue that the recipient is not available for engaging in an instant messaging session.

Upon the initiator's request, additional information regarding the availability of the intended recipient may be provided to the initiator. For example, a user interface element may be provided to the initiator when the initiator selects the visual representation of the intended recipient. The user interface element provides additional information regarding the availability of the intended recipient to engage in an instant messaging communication session. The additional information can include, but is not limited to, the number of unread electronic messages that the initiator has received from the intended recipient, the number of voice mail messages from the intended recipient to which the initiator has not listened, and the appointment schedule of the intended recipient. The user interface element can optionally include a communication interface to allow the initiator to establish a communication link with the intended recipient. Such a communication interface, for example, can provide an instant messaging link, a telephone link, or an e-mail link between the initiator and the intended recipient.

The present invention not only allows an initiator to access information regarding the availability of an intended recipient to participate in a communication session, as discussed above, but it also informs the intended recipient that the initiator is accessing such information. Accordingly, another aspect of the invention relates to a method for informing an intended recipient that an initiator is accessing selected information regarding the intended recipient. The method includes the step of providing the intended recipient with a visual representation of the initiator and includes the additional step of presenting a user interface element associated with the representation of the initiator to the intended recipient when the initiator initiates accessing selected information regarding the intended recipient.

Upon reviewing the information regarding availability of an intended recipient, an initiator may initiate the establishment of a communication link with the intended recipient. By initiating a communication link, the initiator illustrates its desire to participate in a communication session with the intended recipient. One aspect of the invention relates to informing the intended recipient that the initiator has initiated establishing the communication link. In particular, this aspect of the invention provides a method for providing information to the intended recipient regarding the initiator's intention to establish a communication session. The method includes the step of providing the intended recipient with a visual representation of the initiator, and further includes the step of presenting a user interface element to the intended recipient associated with the representation of the initiator when the initiator initiates establishing a communication link with the intended recipient. The user interface element informs the intended recipient of the initiator's intention to establish a communication session.

Upon being informed of the initiator's request for establishing a communication session, the intended recipient can accept the request, ignore the request or request additional information regarding the initiator's intended message. If the intended recipient requests such additional information, the method of the invention provides the intended recipient with a user interface element, such as a contact preview window on a computer desktop, that provides information regarding the message that the initiator intends to transmit. For example, in a computer environment, the contact preview window can include at least a portion of an intended message, to allow the intended recipient to decide whether to accept or to ignore the initiator's request.

A communication session is established only after the intended recipient accepts a request by the initiator. In one embodiment of the present invention, each party is informed whether an active communication session is established between the parties and are interactively engaged in communicating with each other. In particular, a signal indicating whether a communication session with the intended recipient is established is sent to the initiator. The signal can be visual, audio, or a combination thereof. Those skilled in the art will appreciate that other types of signals can also be employed. For example, the vibrations of an object can provide the requisite signal.

In one preferred embodiment of the invention, the background color of a window, such as a message window on a computer desktop, can be selected to provide a signal indicating whether an active communication session between two parties is established. For example, a white background can indicate that a communication session exists, and a gray background can signal that the number of participants in the communication session is less than two.

Another aspect of the invention relates to preventing a premature termination of an active communication session. In accordance with this aspect of the invention, a method informs a participant in a communication session that another participant intends to terminate its participation in the session. In particular, a user interface element is provided for signaling that a participant intends to terminate its participation in the session. Further, one embodiment of the invention provides a count-down period upon a party's initiation to terminate its participation in a session during which the impending termination can be aborted. For example, upon being informed of a party's intention to terminate a session, other participants may transmit some information to the terminating party which may prompt the terminating party to abort the impending termination. This advantageously prevents a pre-mature termination of a party's participation in a session.

One preferred embodiment of the invention in which the electronic device is a computer, provides an indicator (such as a visual, an audio, or a combined visual and audio signal) for indicating a party's intention to terminate its participation in a communication session. The signal, for example, can be selected to be a textual message. Further, an indicator, such as a graphical indicator, can be provided for indicating the passage of a count-down period before the party terminates its participation. The graphical indicator can be selected to be a plurality of dots appearing sequentially as the count-down period passes, where each dot has a diameter that is smaller than that of a previous dot to indicate approximately the time remaining in the count-down period The various aspects of the method of the invention, as delineated above, can be implemented in a computer system having means for establishing a communication session among distributed parties. The computer system can include computers under the control of respective parties. Those skilled in the art will understand that the method of the invention can be also be implemented in other electronic devices, such as cellular phones, information appliances, pagers, personal digital assistants and the like.

A computer program for implementation of the method of the invention can be written in any suitable programming language by employing standard programming practices. The computer program may be a source code, an object code, or an executable code. The computer program can be stored in a computer-readable medium such as a CD-ROM, a floppy disk, a hard disk and/or any other suitable computer-readable medium.

Illustrative embodiments of the present invention will be described below relative to the following drawings.

DETAILED DESCRIPTION

An illustrative embodiment, consistent with the principles of the present invention, relates to method and system for providing reciprocal information to two or more parties regarding activities of each other. The parties can establish a communication session, such as an instant messaging session, with each other. The illustrative embodiment of the invention will be described below relative to a plurality of interconnected distributed computers, where each party controls one of the computers. The present invention allows each party to obtain information regarding selected activities of another party. For example, information may be provided to determine an opportune time to initiate establishing a communication session, such as an instant messaging session, with the other party. Although the illustrative embodiments of the invention are described relative to a plurality of computers, those skilled in the art will understand that the method of the invention can be implemented with other electronic devices, such as cellular phones, information appliances, pagers, personal digital assistants (PDA's) and the like.

The present invention can be implemented in a peer to peer environment, where a module implementing the method of the present invention runs on each peer. Alternatively, the present invention can be implemented in an environment having a centralized distribution architecture, as discussed below. Alternatively, a hybrid structure employing aspects of the peer to peer environment and the centralized architecture can be employed.

Figure 1:
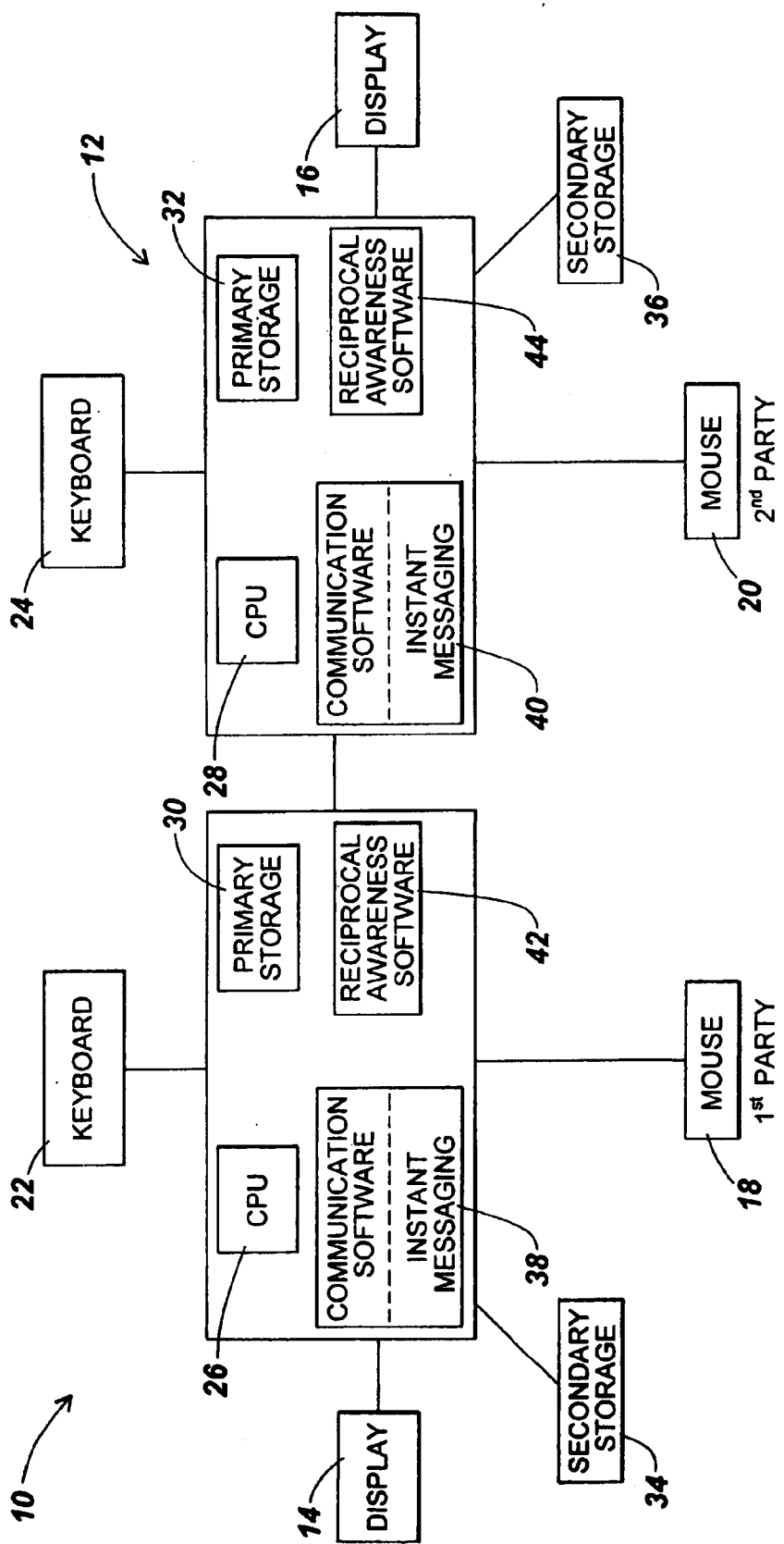
FIG. 1 illustrates a computer system for implementing a method of an illustrative embodiment of the present invention in a peer to peer environment.

FIG. 1 illustrates a suitable environment for practicing the illustrative embodiment. A computer system 10, controlled by a first party, interacts with a computer system 12, controlled by a second party, who may be located at a remote geographic location from the first party. The computer systems 10 and 12 include respective display devices 14 and 16. In addition, the computer systems 10 and 12 include respective input/output devices, such as mice 18 and 20, and keyboards 22 and 24. Further, the computer systems 10 and 12 include central processing units (CPU) 26 and 28 for executing instructions. The computer systems 10 and 12 also include primary storage media, such as random access memory (RAM), 30 and 32, and secondary storage media, such as hard disks 34 and 36.

The computer systems 10 and 12 include communication softwares 38 and 40 for establishing a communication link therebetween. For example, the communication softwares 38 and 40 can be selected to establish an instant messaging communication between the computers 10 and 12. Further, the computer 10 and 12 have software modules 42 and 44, herein referred to as "reciprocal awareness software," that implement the method of the invention.

Those skilled in the art will appreciate that the depiction of the environment in FIG. 1 is intended to be merely illustrative and not limiting of the present invention. Additional interconnected computers and parties can be employed in practicing the invention. The depiction of two computer systems 10 and 12 is intended to depict a simple case without any loss of generality.

Figure 2:
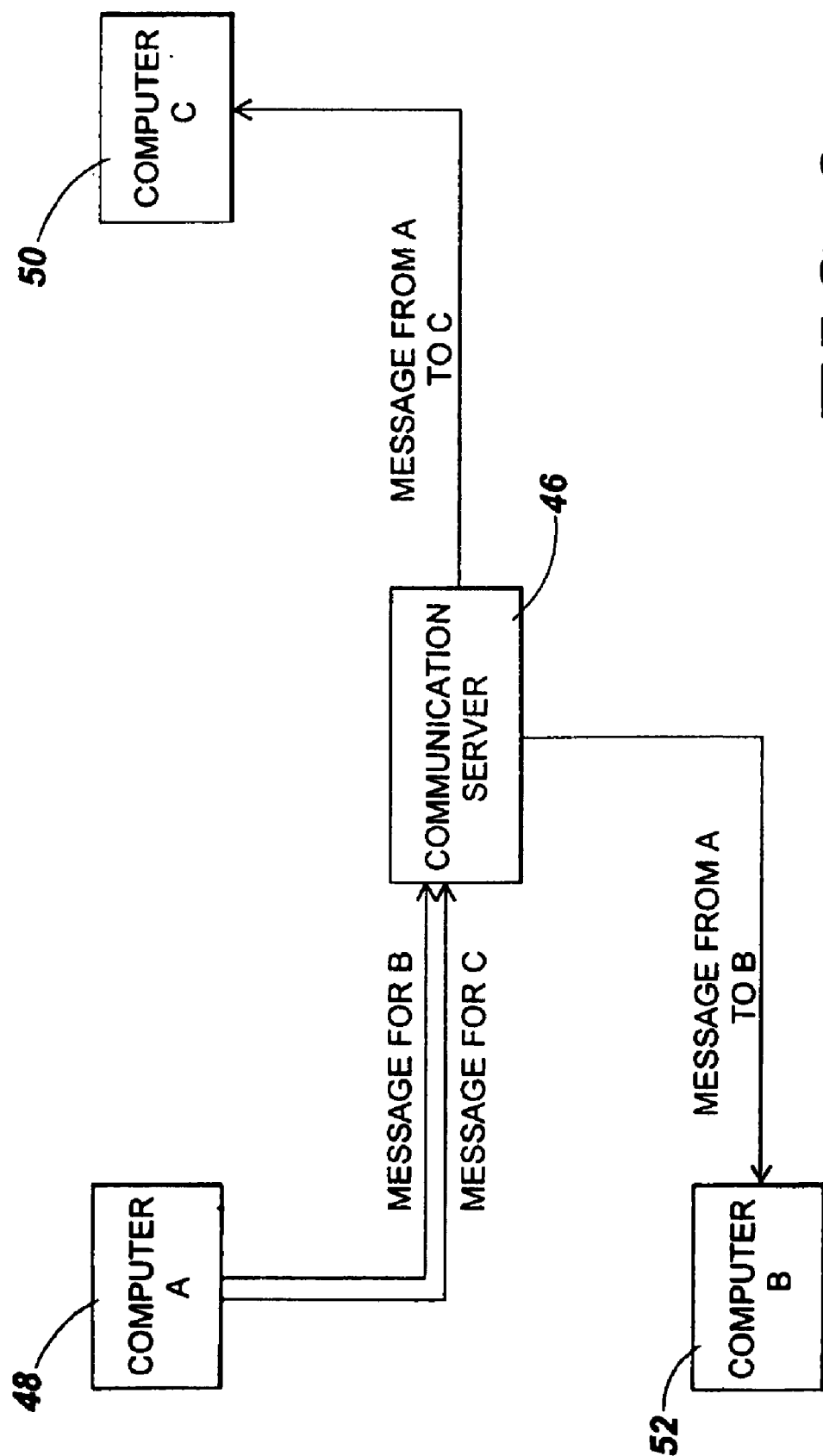
FIG. 2 illustrates an alternative computer system having a centralized architecture for implementing the method of the invention.

FIG. 2 illustrates an alternative environment for practicing the method of the invention, where a centralized architecture is used. In this alternative environment, a communication server 46, such as an instant messaging server, provides a communication link among a plurality of computers, such as computers 48, 50, and 52. The server 46 receives messages from each computer and transmits the received messages to the intended recipients. Further, the server 46 can include at least a portion of a software module that implements the method of the invention.

Figure 3A:
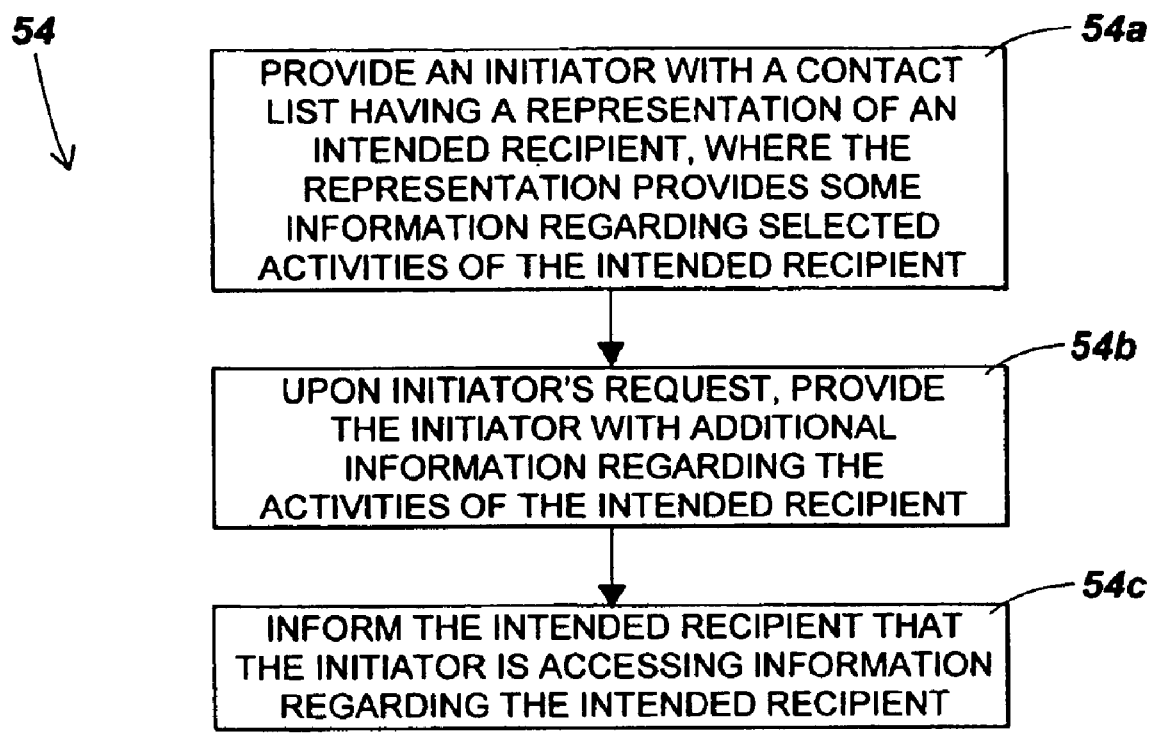
FIG. 3A is a flow chart depicting the various steps of an illustrative embodiment for practicing one aspect of the present invention.

FIG. 3A illustrates a flow chart 54 depicting the various steps of an illustrative embodiment of one aspect of the method of the invention for providing at least two parties with reciprocal information regarding each other's activities. The method provides a contact list in step 54a for each party which includes a representation of the other party. The contact list also includes information regarding selected activities of the other party. Such information can include, but is not limited to, whether the other party is engaged in a telephone conversation, engaged in an instant messaging session, etc. This information is periodically updated to provide each party with current information regarding the other party's availability for engaging in a communication session.

If one party, herein referred to as the initiator, requests additional information regarding the other party, herein referred to as the intended recipient, the illustrative embodiment in step 54b provides such additional information to the initiator. This additional information further assists the initiator in deciding whether it is an opportune time for engaging in a communication session, such as an instant messaging session, with the intended recipient.

In step 54c, the intended recipient is informed that the initiator is accessing information regarding the intended recipient, thereby providing the parties with reciprocal awareness of each other's actions.

Figure 3B:
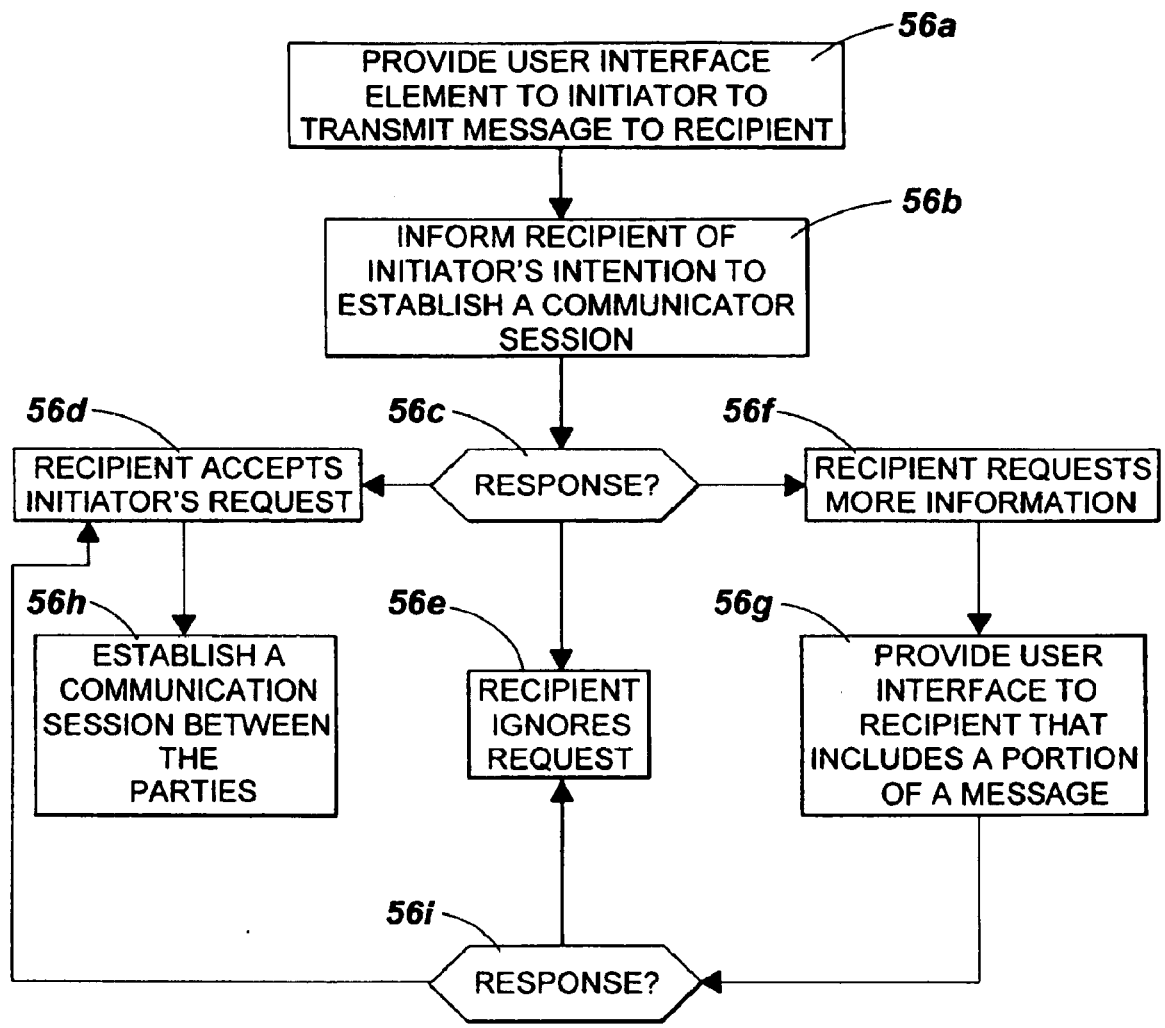
FIG. 3B is another flow chart depicting the various steps of an illustrative embodiment for practicing another aspect of the present invention, FIG. 4A schematically illustrates the computer desktop of the initiator, where the desktop includes a display window containing a contact list, FIG. 4B schematically illustrates the computer desktop of the intended recipient who participates in a communication session with other parties listed in a contact list within a display window on the computer desktop.

FIG. 3B is a flow chart 56 depicting the various steps of another embodiment of the invention. In this alternative embodiment, in step 56a, upon an initiator's initiation to establish a communication session with an intended recipient, a user interface element is provided to the initiator to allow the initiator to transmit a message to the intended recipient. In step 56b, the intended recipient is informed of the initiator's intention to establish a communication session. The intended recipient may respond in multiple ways (see step 56c). The intended recipient can either accept the initiator's invitation (step 56d), ignore the invitation (step 56e), or request more information (step 56f). If the intended recipient accepts the invitation, a communication session is established between the parties, as shown in step 56h. If the intended recipient requests to have more information about the initiator's invitation (step 56f), a user interface element is provided to the intended recipient (step 56g). The user interface element presents at least a portion of a message that the initiator intends to transmit. Upon reviewing this information, the intended recipient can respond (step 56i) by either accepting the initiator's invitation (step 56d), or ignore the invitation (step 56e). If the intended recipient accepts the initiator's invitation, a communication session is established between the initiator and the intended recipient, as shown in step 56h.

Without any loss of generality, an example of operation of the illustrative embodiment will be described below by referring to two parties, herein named Janak and John, who can communicate with each other by utilizing, for example, the computers 10 and 12 (FIG. 1), respectively. Again without any loss of generality, in the following illustrative embodiment, John is selected to be the initiator, and Janak is selected to be the intended recipient.

Figure 4A:
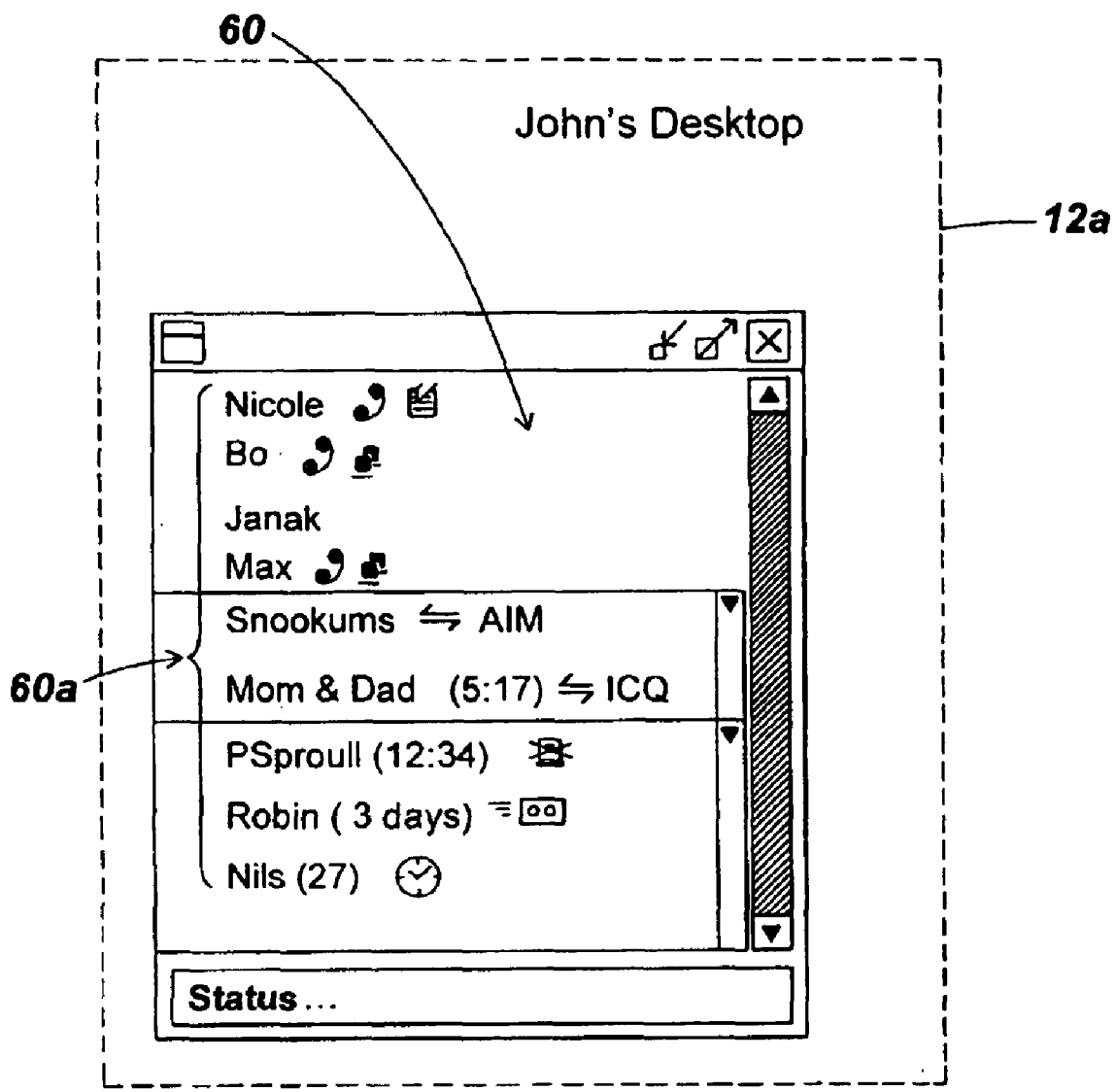
Figure 4B:
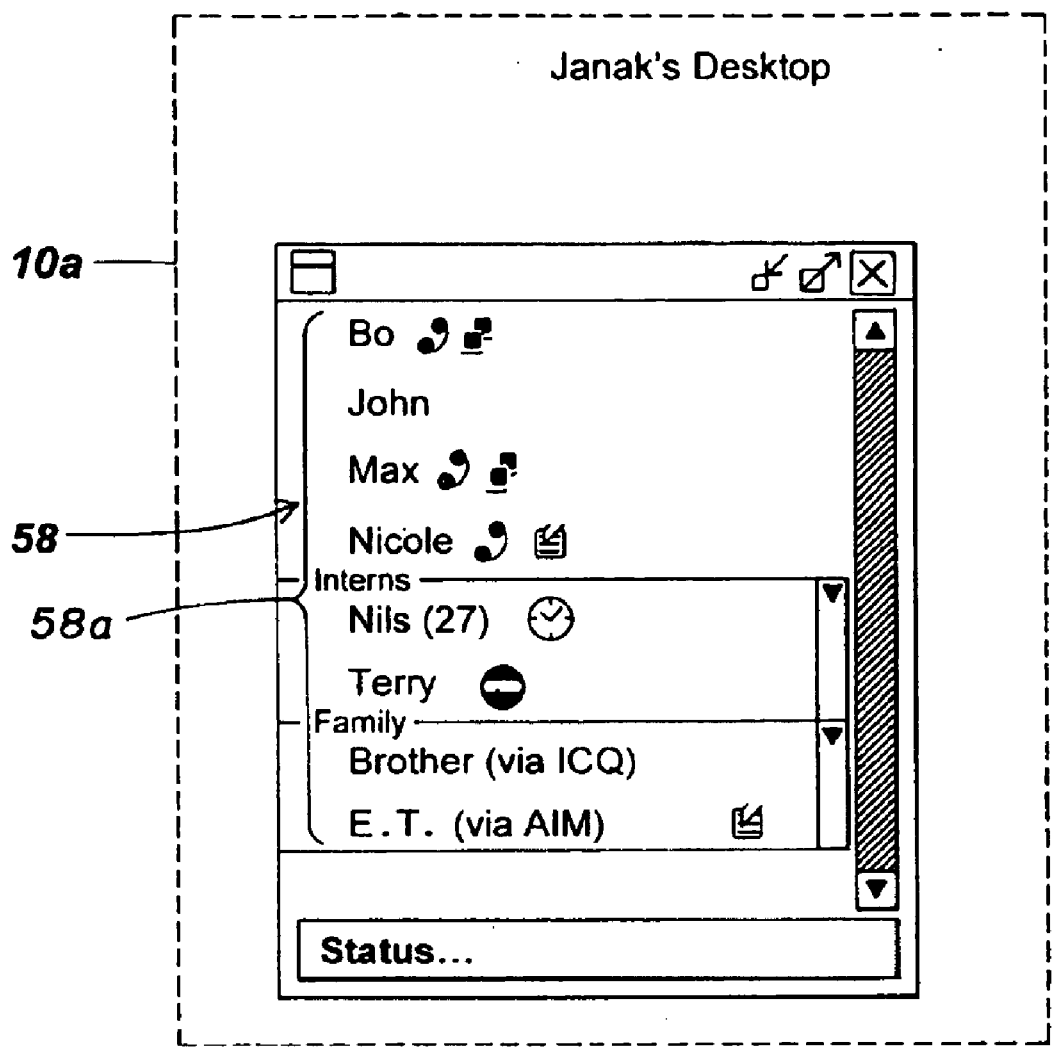

FIG. 4A shows that John's desktop 12a includes a display window 60 containing John's contact list 60a with Janak's name. FIG. 4B illustrates Janak's computer video display 10a. The display is a 'desktop' that includes a display window 58 with Janak's contact list 58a. The contact list 58a includes visual representations of the parties. The contact list includes John, with whom Janak can establish a communication link. Each visual representation can include a handle depicting one of the parties. The handle can be either textual, graphical or a combination thereof. In this illustrative example, Janak's contact list 58a includes John's name as a textual handle for representing John. Those skilled in the art will appreciate that many different visual representations can be employed in practicing the present invention. For example, a graphical handle, a textual handle or a hybrid thereof can be employed to represent each party in a contact list.

Figure 5A:
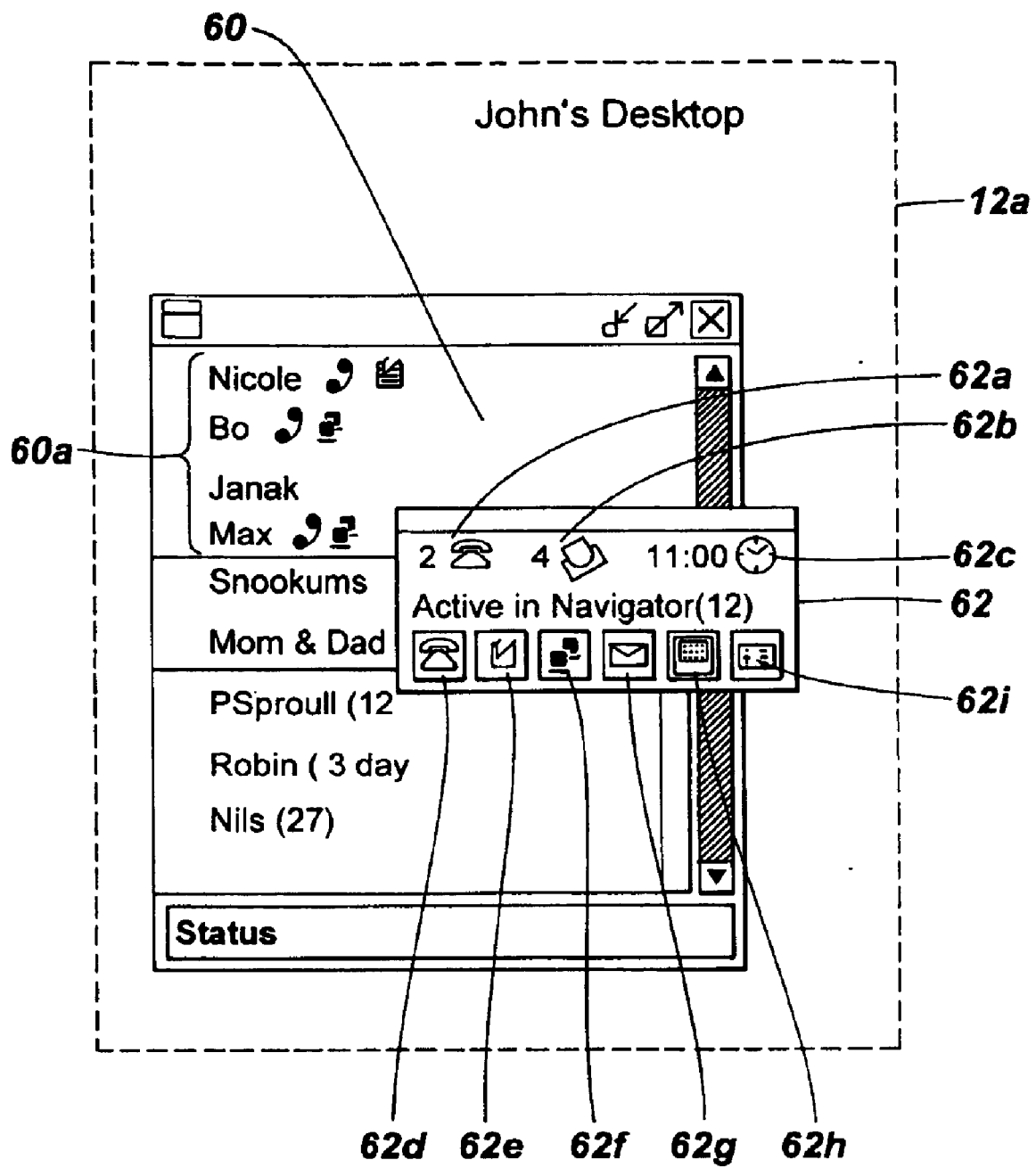
FIG. 5A illustrates the display window of FIG. 4A and further illustrates an information window presented to an initiator upon the initiator's request to obtain additional information regarding selected activities of an intended recipient.

The illustrative embodiment allows both John and Janak to obtain information regarding the availability of the other party to participate in a communication session, such as an instant messaging session. As shown in FIG. 5A, John can obtain additional information about Janak's selected activities by selecting the visual representation of Janak (i.e., Janak's name) in John's contact list 60a. For example, John can select Janak's entry in the contact list 60a through a point and click operation. Upon John's selection of Janak's entry, an information window 62 appears on John's desktop 12a. The information window 62 includes selected information about Janak's activities. In particular, the illustrative information window 62 includes a telephone icon 62a, an envelope icon 62b, and a clock icon 62c. The telephone icon 62a indicates that John has two voice mail messages from Janak to which he has not listened. The envelope icon 62b indicates that John has four unread e-mail messages from Janak. Further, a message next to the clock icon can be provided to inform John of Janak's appointments for the day. Further, the illustrative information window 62 informs John that Janak has been active in the Navigator Web Browser for the last twelve minutes.

The information regarding Janak's selected activities in the visual representation indicates to John whether Janak is likely to be available to participate in a communication session with John. In particular, John can utilize the information provided in the information window 62 to decide whether it is an appropriate time to contact Janak. For example, John may decide that he should first listen to the voice mails from Janak and/or read the unread e-mail messages from Janak before initiating a contact. If John decides to initiate a contact with Janak, he can choose one of the communication options provided in the information window 62 to initiate such a contact. The illustrative information window 62 presents John with a number of communication options, represented by icons 62d, 62e, 62f, and 62g. For example, John can initiate establishing a telephone link with Janak by simply clicking once on the icon 62d, or initiate establishing an instant messaging link by clicking once on the icon 62e. Alternatively, John can establish a data conferencing session with Janak by selecting the icon 62f. John may instead of initiating a synchronous communication decide to initiate an asynchronous communication. For example, he may decide to send Janak an electronic mail (email) rather than place a call to Janak because, for example, the information provided in the window 62 indicates that Janak is attending a meeting. In such a case, John can click on the icon 62g to send an email to Janak.

In addition, the illustrative embodiment allows John to launch a default communication option, such as an IM link, by double-clicking on Janak's name in the display window 60. Further, John can select an icon 62h to obtain information regarding Janak's scheduled appointments, and can select an icon 62i to access Janak's electronic business card.

Figure 5B:
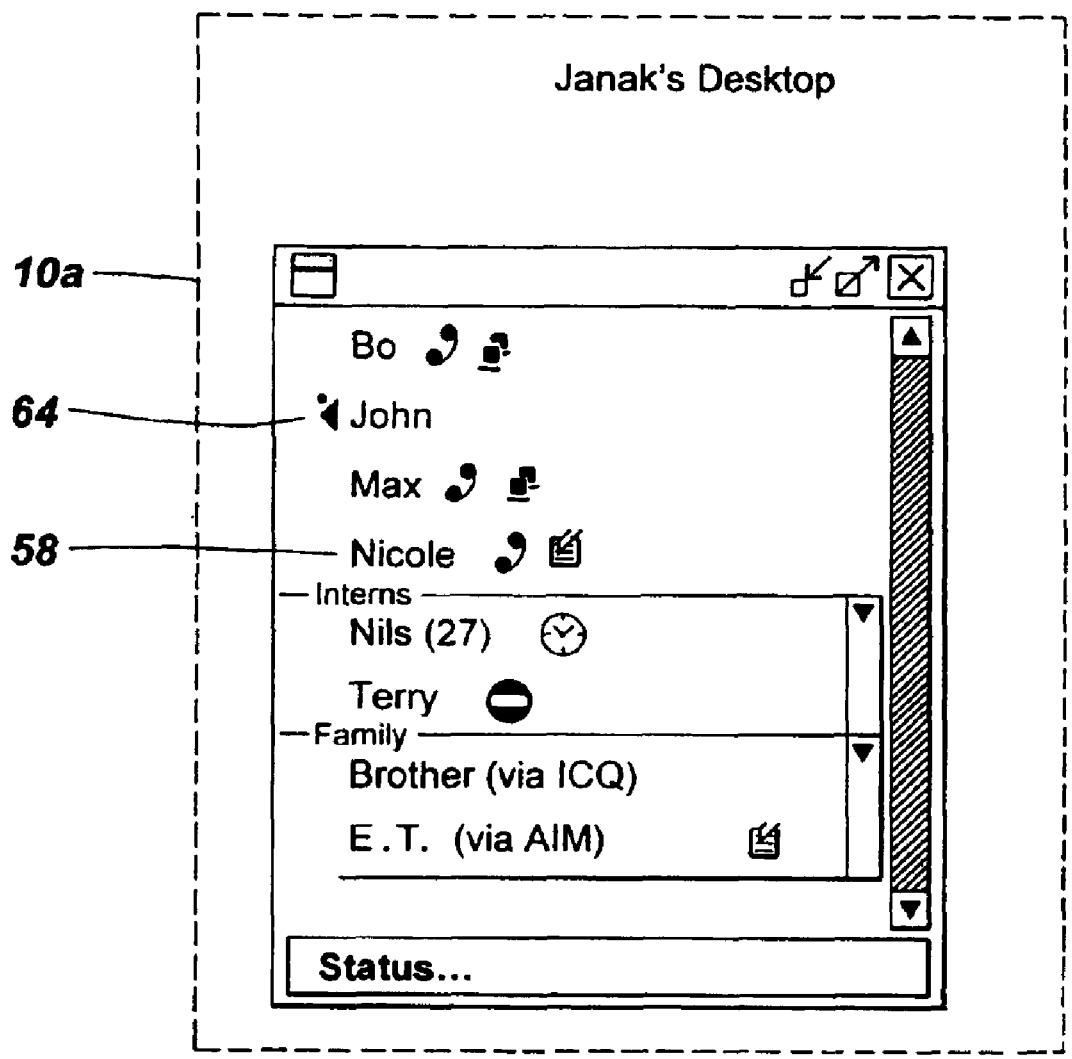
FIG. 5B illustrates the display window of the intended recipient and further illustrates an animated icon associated with the visual representation of an initiator to inform the intended recipient of the initiator's access to information regarding selected activities of the intended recipient.

Upon John's accessing information about Janak's activities, the illustrative embodiment provides a user interface element in Janak's display window 58 to inform Janak that John is viewing selected information about Janak. The user interface element can be visual, audio, or a combination thereof. With reference to FIG. 5B, the illustrative embodiment presents an animated icon 64 associated with John's name in Janak's display window 58 to inform Janak that John is viewing information regarding Janak's activities. Thus, while John is viewing selected information regarding Janak's activities, Janak is reciprocally aware of John's action. Janak's awareness of John's action, i.e., John's access to information regarding selected activities of Janak, has a number of advantages. In particular, it provides safeguards against a party abusing the ability to obtain information regarding another party's activities. These safeguards are similar to those present when people are physically co-located. For example, in a physically co-located environment, a person's awareness that a co-worker is lurking outside her office discourages the co-worker from engaging in such a behavior. Similarly, in the illustrative system, Janak's awareness that John is viewing information about Janak's activities discourages John from unduly monitoring Janak's activities. In addition, the information provided to Janak also tells Janak that John is about to contact her. Janak may also be provided with a preview of an impending communication.

Figure 6A:
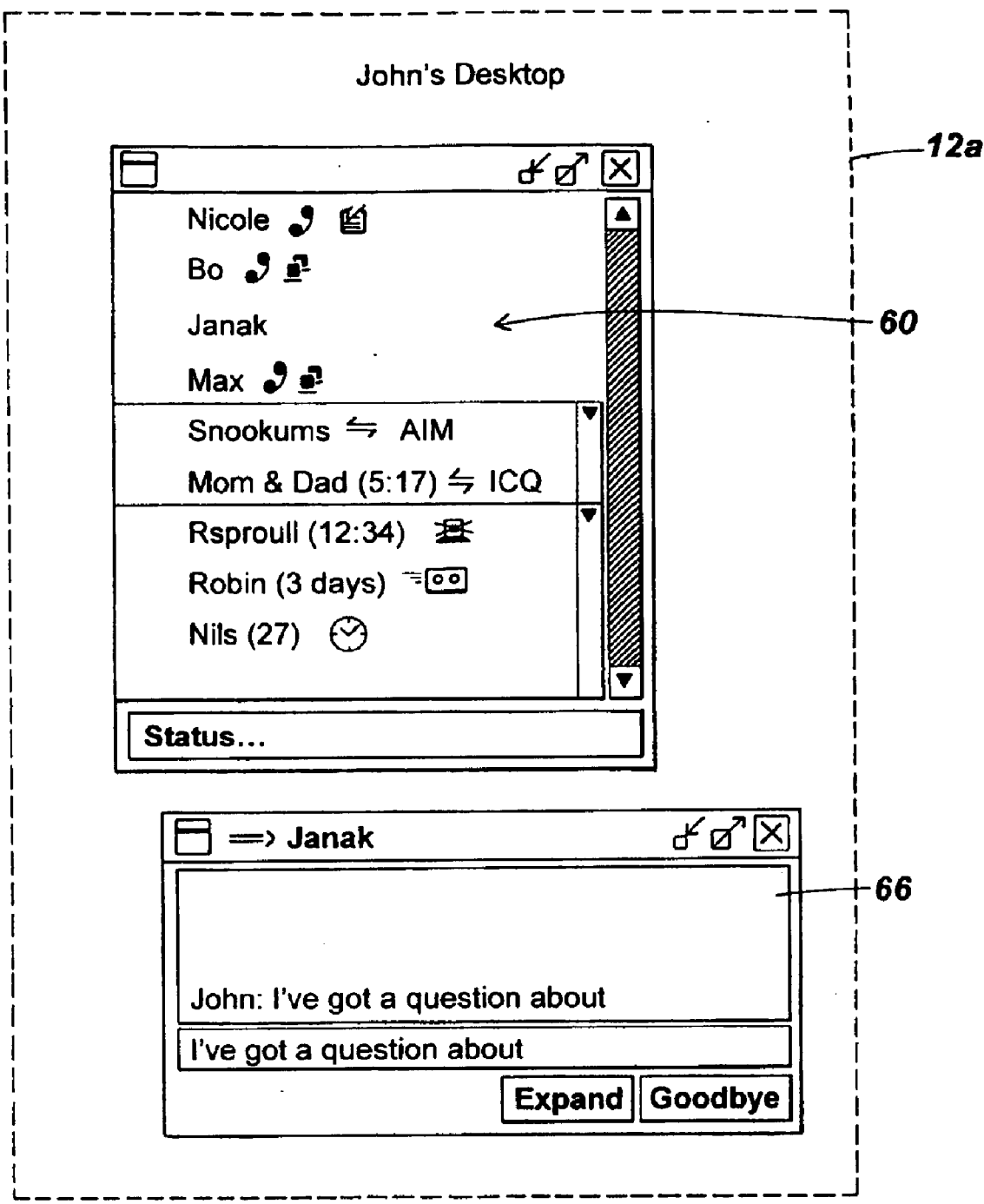
FIG. 6A illustrates the display window of an initiator and further illustrates a message window presented to the initiator upon initiation of establishing a communication link with an intended recipient.

With reference to FIG. 6A, after viewing the information regarding Janak's activities, John may decide that it is an opportune time to initiate establishing an IM communication link with Janak. John can initiate establishing an IM link with Janak, for example, by double clicking on Janak's name in the display window 60. Upon John's initiation of a communication link with Janak, a message window 66 appears on John's desktop 12a in which John can provide a textual message to be transmitted to Janak.

A mutual communication session is, however, established only after Janak accepts John's request for engaging in a communication with John. The illustrative embodiment presents John with a visual signal that indicates whether a communication session with Janak has been established, i.e., whether Janak has accepted John's request for establishing a communication session. In particular, the gray background color of John's message window 66 (FIG. 6A) indicates that a communication session between John and Janak has not been yet established. Those skilled in the art will understand that other signals, either visual or audio or both, can be employed to inform a party whether a communication session with another party has been established.

Figure 6B:
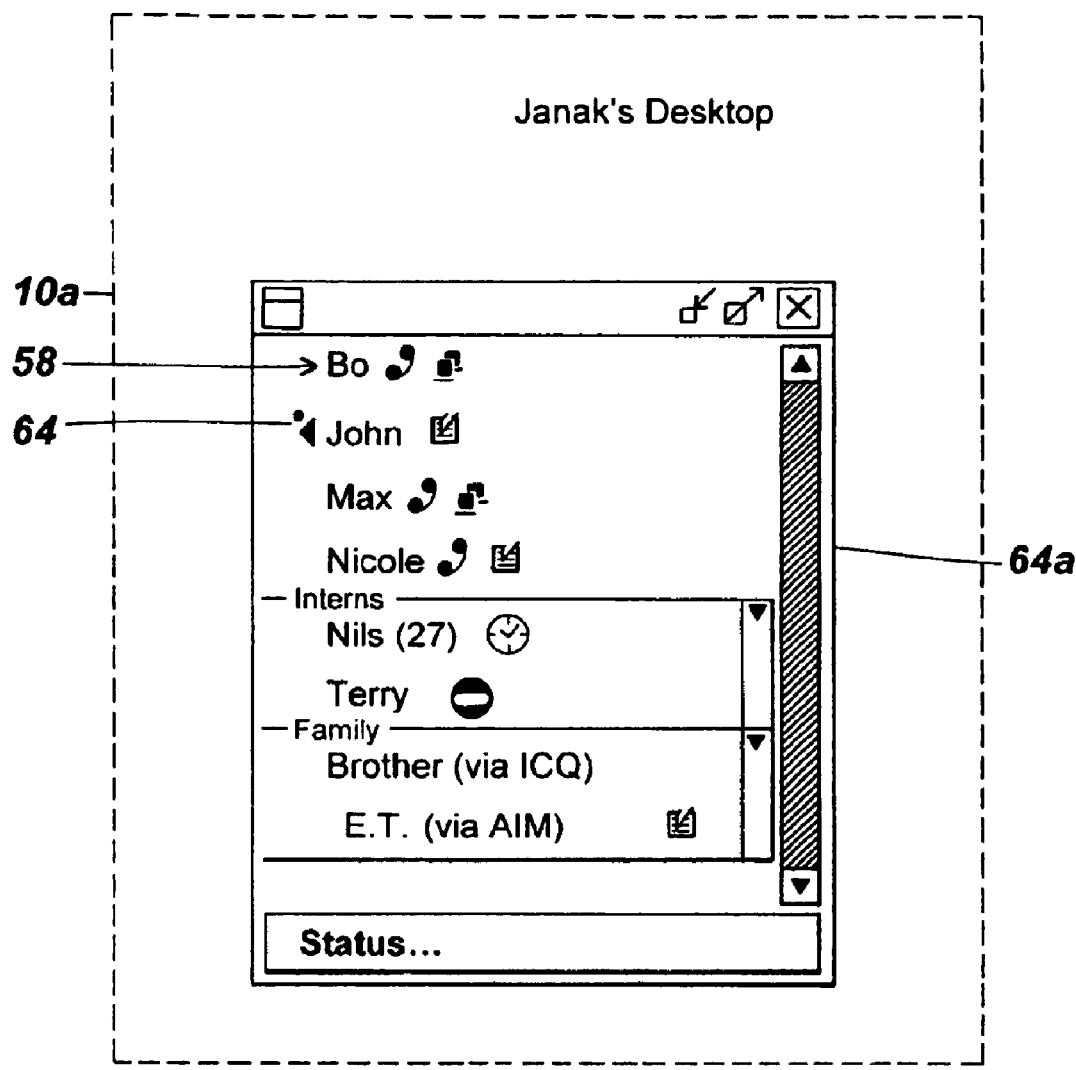
FIG. 6B shows the display window of the intended recipient of the initiator of FIG. 6A which illustrates a graphical icon informing the intended recipient of the initiator's request for establishing a communication link.
Figure 6C:
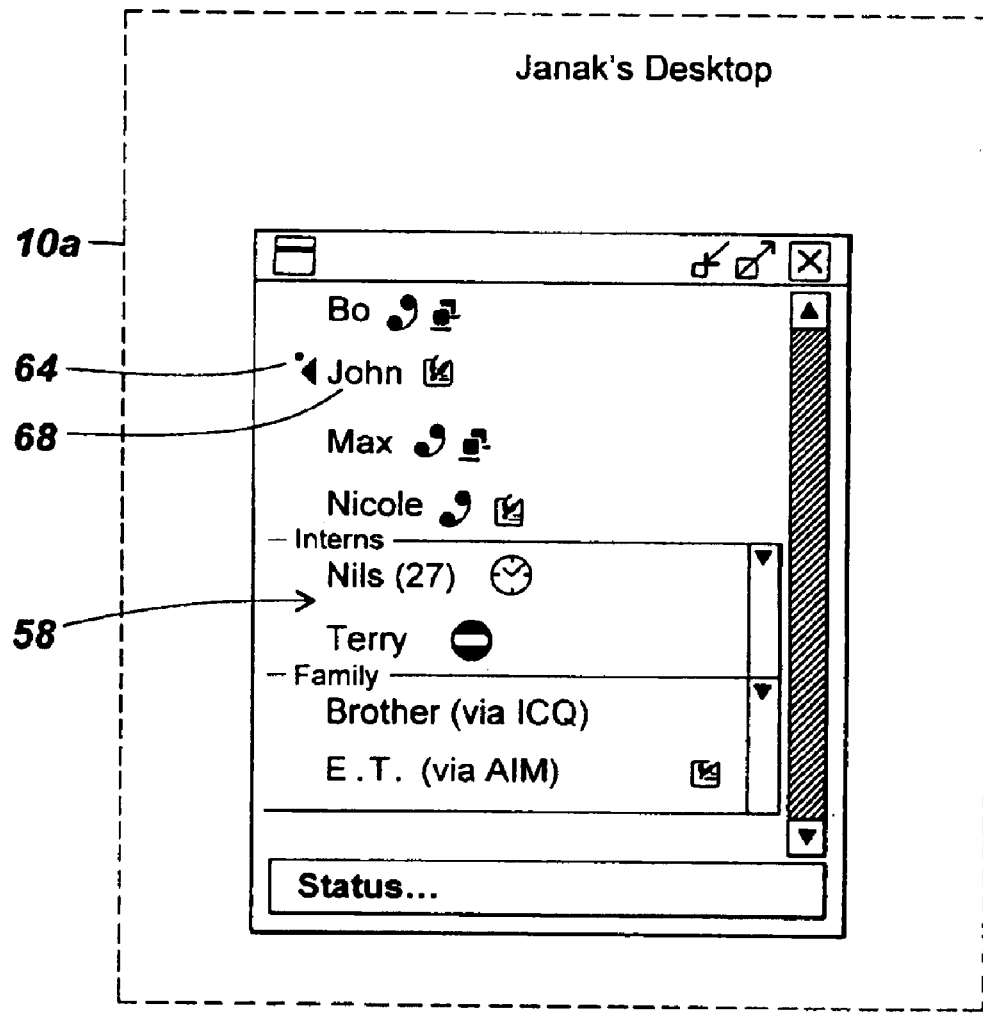
FIG. 6C illustrates the display window of FIG. 6B with addition of a contact preview window presented to the intended recipient upon a request by the intended recipient to obtain more information regarding a message that the initiator intends to transmit.

With reference to FIG. 6B, upon John's initiation of an instant messaging link, an icon 64a in Janak's display window 58 informs Janak of John's intention to establish a communication session. Before accepting or ignoring John's request for establishing a communication session, Janak may want to have some information regarding the message that John intends to transmit. FIG. 6C shows that in the illustrative embodiment of the invention, Janak can position a mouse cursor over the animated icon 64 to initiate opening a contact preview window 68 that includes the message that John has provided in the message window 66. For example, in this illustrative example, Janak knows that John has a question. This information helps Janak to decide whether to accept or ignore John's request. Janak may decide to ignore John'sattempt to initiate a communication session. Janak may even decide to start some other activity, for example initiating a telephone call, to provide a plausible reason why Janak is not responding to John's request.

Figure 7A:
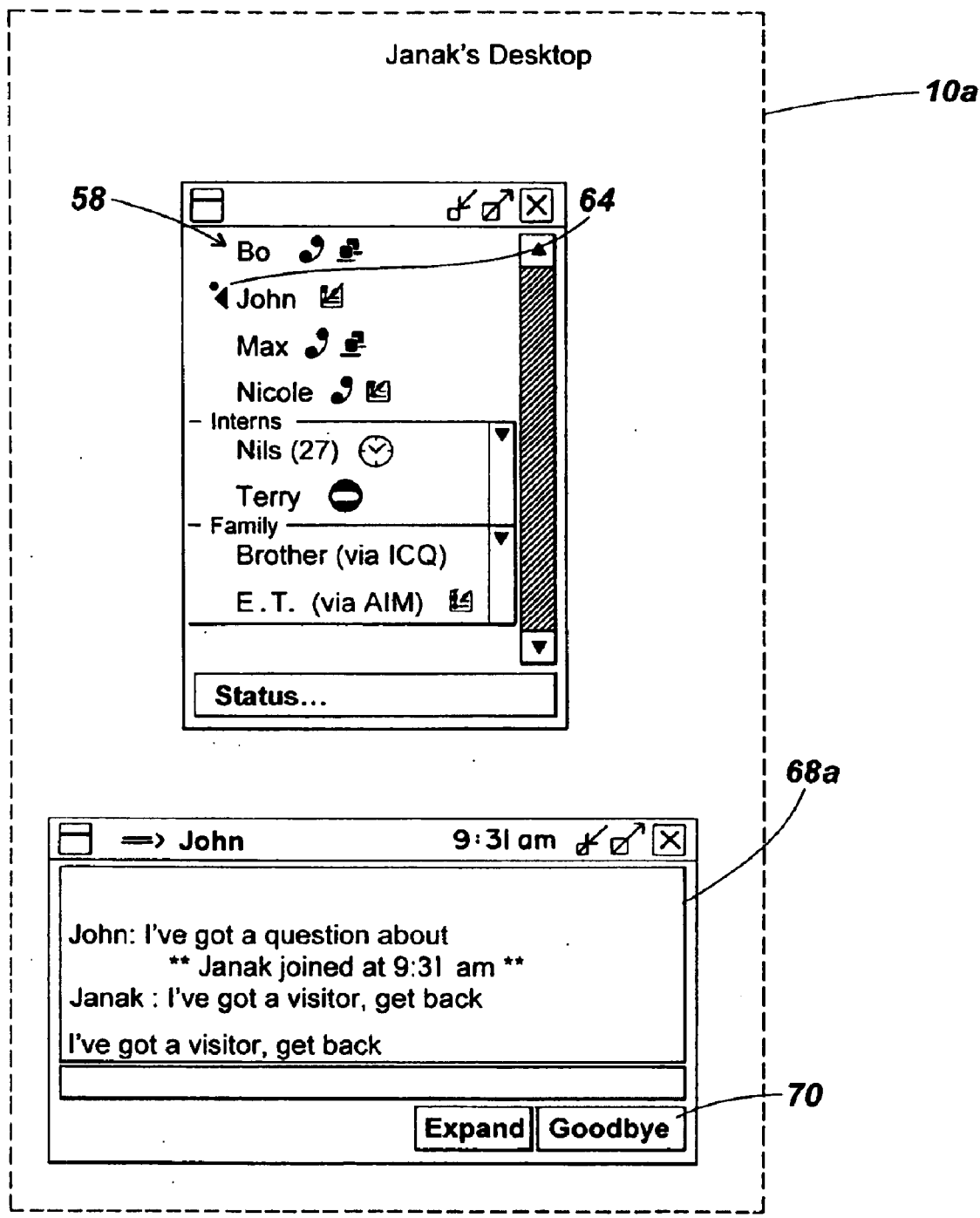
FIG. 7A illustrates the display window of the recipient and a message window presented to the recipient after the recipient accepts the initiator's request for a communication session.
Figure 7B:
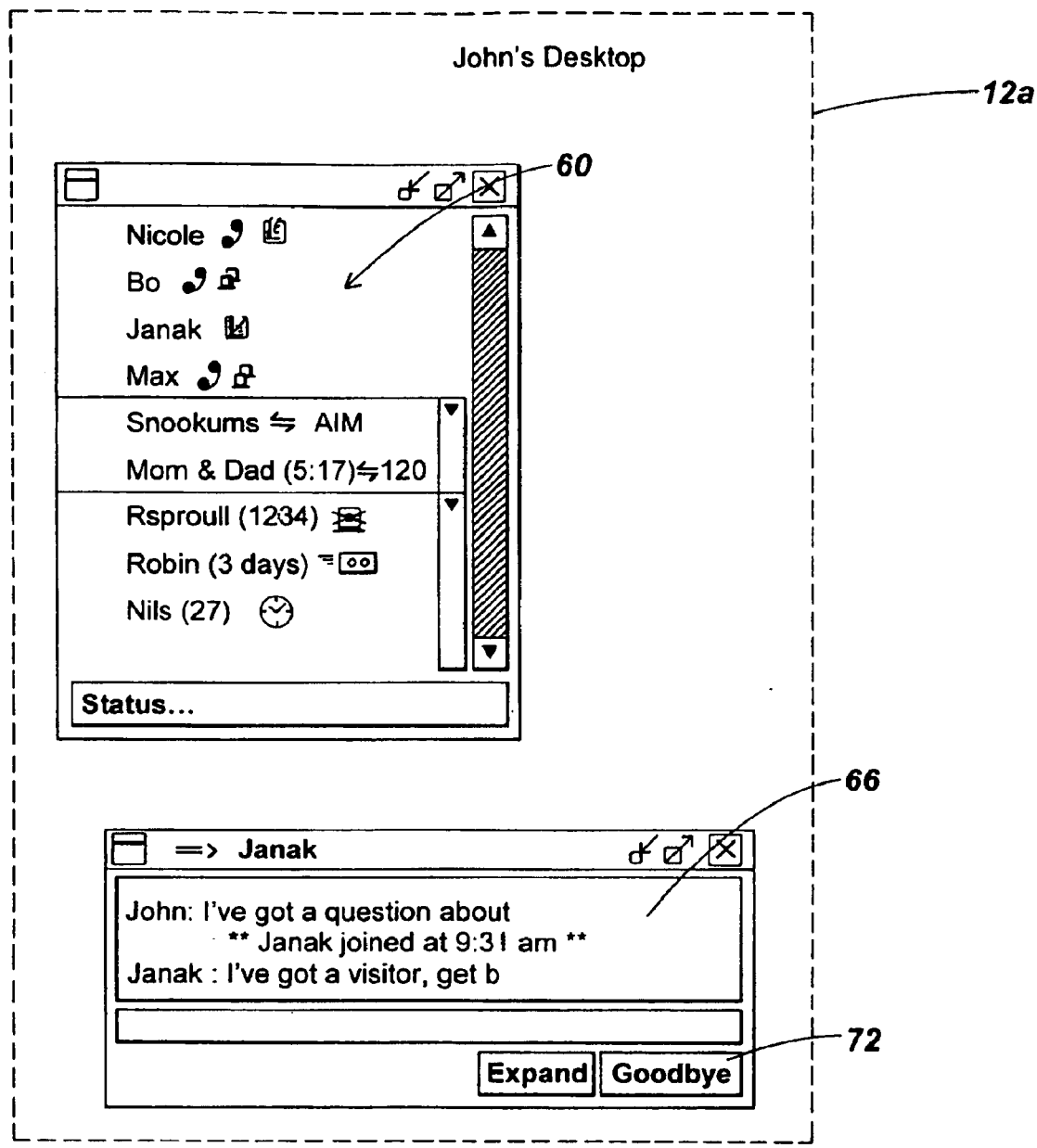
FIG. 7B illustrates the display and message windows of the initiator after a communication session is established with the recipient.

With reference to FIG. 7A, If Janak decides to accept John's request for establishing a communication session, Janak can simply select John's name in the display window 58, for example by double clicking on John's name, or clicking on the animation icon 64, to open a message window 68a to establish a communication session with John. As shown in FIG. 7B, once the communication session is established, the background color of John's message window 66 changes from gray to white. The change in the background color indicates to John that a communication session with Janak has been established. In addition, the background color of Janak's message window is also white, indicating to Janak that John's message window 66 is open. Some preferred embodiments of the invention provide the parties with an audio signal in lieu of or in addition to a visual signal to indicate that a mutual communication session has been established.

John and Janak can provide messages in their respective message windows 66 and 68a to be transmitted to the other party. Hence, John and Janak can engage in a conversation in real time.

Physically co-located individuals typically provide each other with non-verbal indications of an intent to end a conversation. The illustrative embodiment provides termination signals, analogous to those transmitted among physically co-located individuals, to inform Janak that John intends to terminate its participation in an established communication session.

Figure 8A:
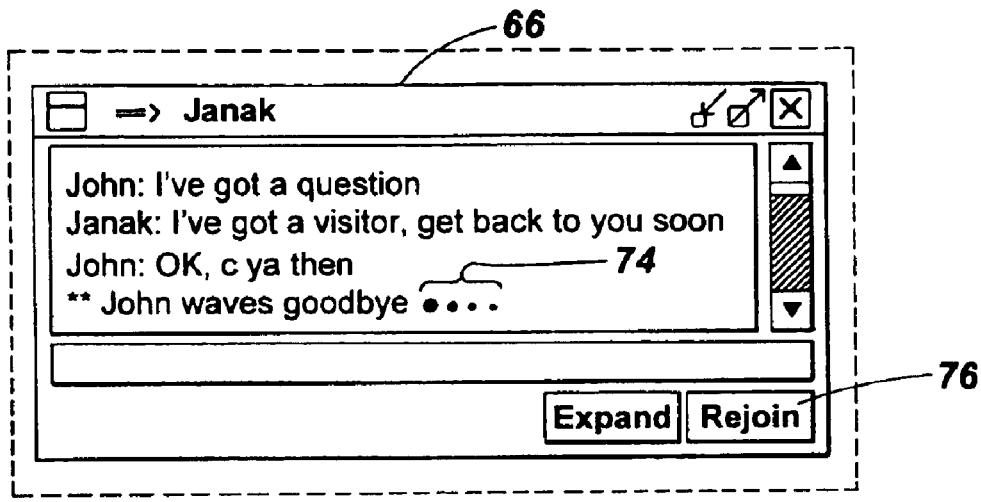
FIG. 8A illustrates the message window of the initiator, where the message window includes a signal indicating that the initiator intends to terminate its participation in the communication session.
Figure 8B:
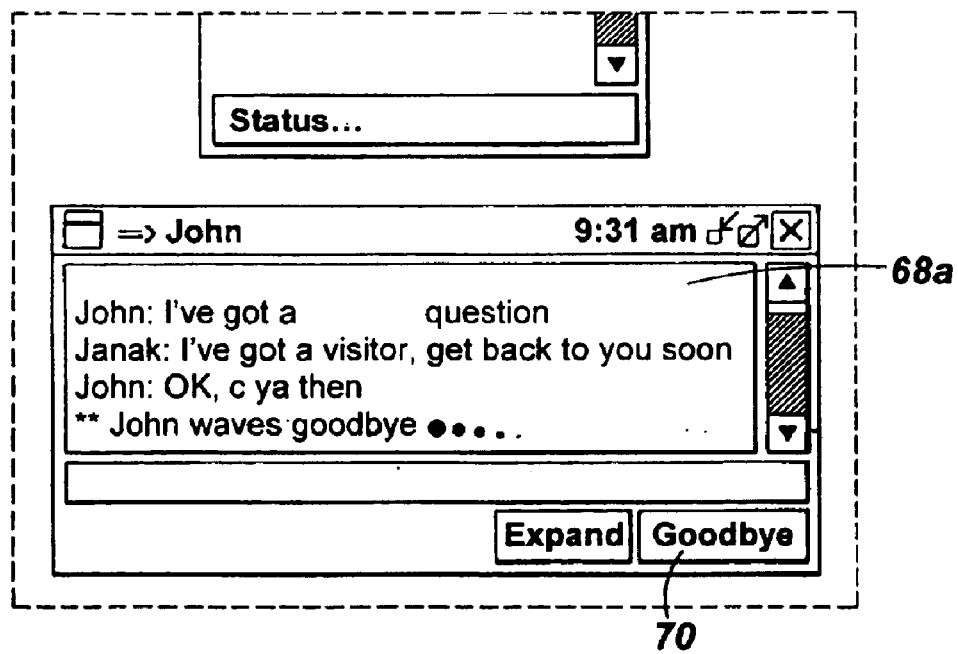
FIG. 8B illustrates the message window of the recipient, where the message window includes a signal indicating that the initiator intends to terminate its participation in the communication session.

Referring to FIGS. 7A, 7B, 8A and 8B, the illustrative embodiment presents each party with a user interface element, such as a Goodbye button 70 or 72 in the message window 68a or 66. These user interface elements allow either Janak or John to terminate her/his participation in an established communication session. In the illustrative embodiment, John can select the Goodbye button 72, for example through a point and click operation, to initiate the termination of its participation in a communication session with Janak. Upon John's initiation to terminate its participation in an established communication session, the illustrative embodiment initiates a count-down period having a selected duration, for example several seconds, before terminating the link established between John and Janak. Further, as shown in FIGS. 8A and 8B, the illustrative embodiment provides a message indicating John's intention to terminate its participation in the communication session. The exemplary message in this embodiment appears in both message windows 66 and 68a, and recites: "John waves goodbye." In addition, the illustrative embodiment provides another visual signal in the form of a plurality of dots 74 to indicate John's intention to terminate the communication session. The plurality of dots 74 start appearing in a sequential manner during the count-down period. In this illustrative embodiment, each dot has a diameter that is smaller than a diameter of a previous dot, thereby depicting in an approximate and schematic manner the remaining time of the count-down period. Those skilled in the art will appreciate that a termination signal can be visual or audio or both.

Further, different messages, textual or graphical or a combination thereof, can be employed to signal a party's intention to terminate its participation in an established communication session.

Further, this practice of the invention provides a user interface element, such as a Rejoin button 76 in the message window 66, to allow John to abort the impending termination of its participation in the communication session during the count-down period. For example, upon becoming aware of John's impending departure, Janak may transmit a last-minute thought to John, which in turn may prompt John to want to continue the conversation. John can conveniently select the Rejoin button 76, for example through a point and click operation, or begin typing in the message window 66, to abort the termination of the communication session with Janak.

The termination signal and the count-down period of the present invention provide a number of advantages over prior art tools, such as those employed in instant messaging chat interactions, for ending a communication session. Such prior art tools, upon a party's initiation to terminate its participation in a communication session, typically break a communication link established between the initiating party and the other parties without providing any advance notice regarding the termination. In such systems, it is cumbersome for the initiating party to restart the conversation with the other parties, for example to convey any last-minute thought, after terminating its participation in the communication session. For example, the initiating party has to re-establish its connection to a network to rejoin the communication session.

Figure 9A:
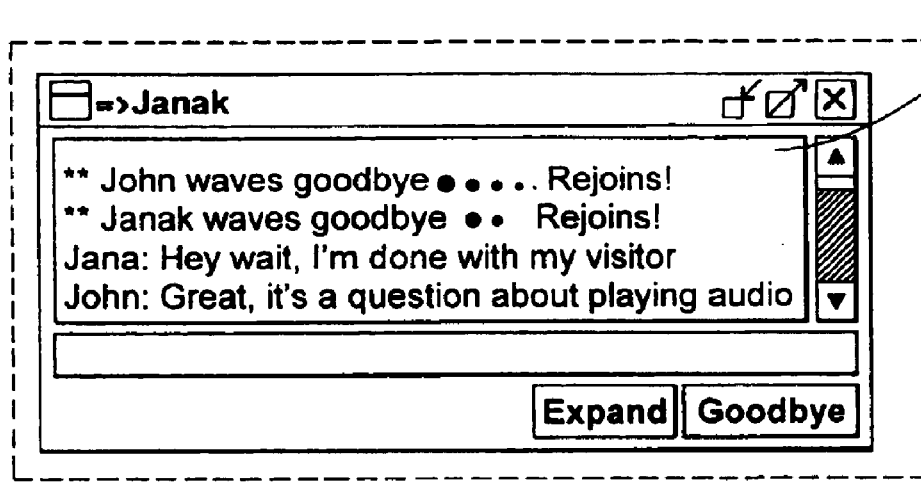
FIG. 9A illustrates the message window of the initiator containing a message that the initiator has aborted an impending termination during a count-down period.
Figure 9B:
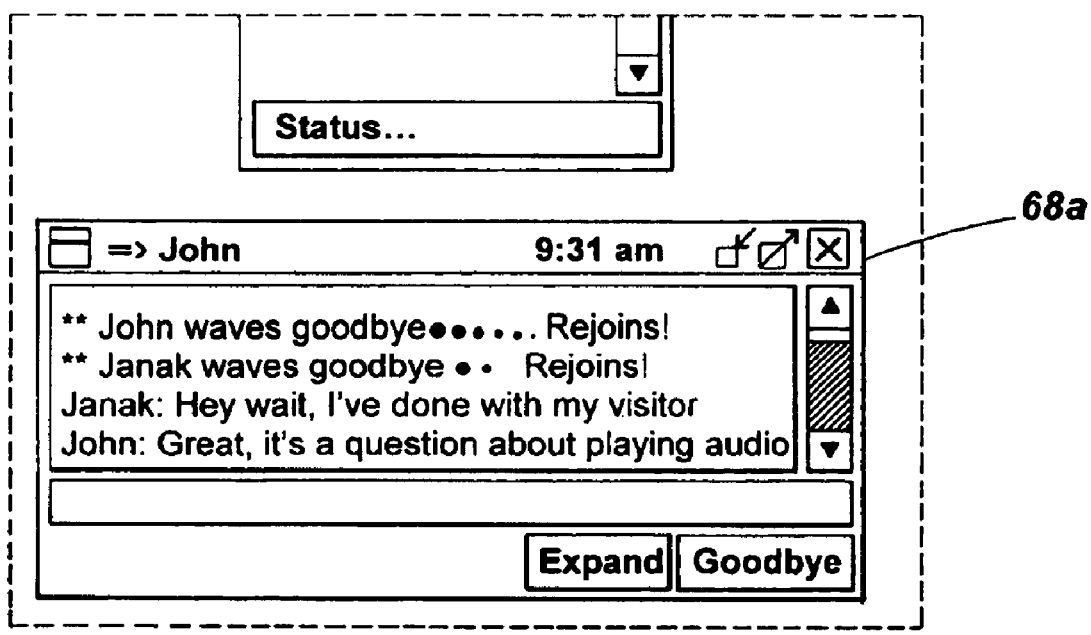
FIG. 9B illustrates the message window of the recipient containing a message indicating that the initiator has aborted the impending termination during the count-down period.

In contrast, the system of the invention prevents a premature termination of a communication session by informing other participants of the terminating party's intention to end its participation in the session. This provides the other participants a chance to convey any last-minute thoughts to the terminating party. Further, the system of the invention allows the terminating party to abort the impending termination during the count-down period without a need to re-establish the communication link. For example, in the illustrative embodiment, John can select the Rejoin button 76, or simply start typing in the message window 66, during the count-down period to abort the impending termination of its participation in the communication session with Janak. In such a case, the illustrative embodiment provides a message, e.g., Rejoins, in John's and Janak's message windows 66 and 68a, as shown in FIGS. 9A and 9B, indicating that John has aborted the impending termination, thereby allowing the conversation to continue.

Thus, the present invention advantageously provides visual and/or audio signals to parties engaged in a communication session, akin to the signals shared by physically co-located individuals, to inform each party that another party intends to terminate its participation in the communication session. Such signals allow each party to smoothly end its participation in the communication session.

Figure 10A:
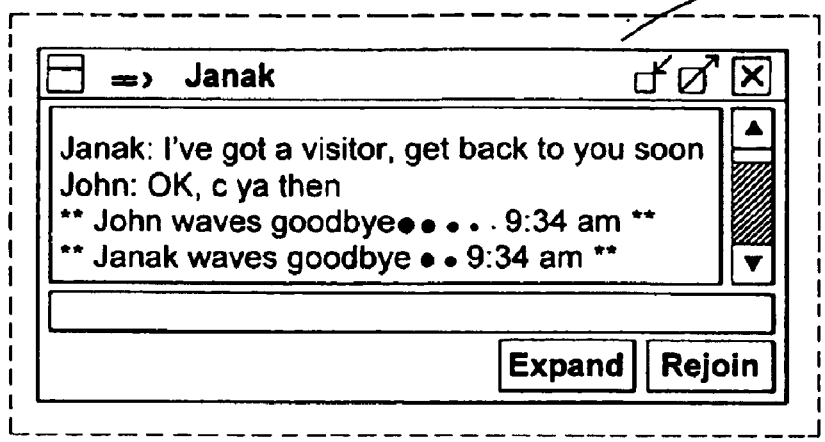
FIG. 10A illustrates the message window of the initiator, and further illustrates a message in the form a time stamp indicating disconnection of the communication link with the recipient.
Figure 10B:
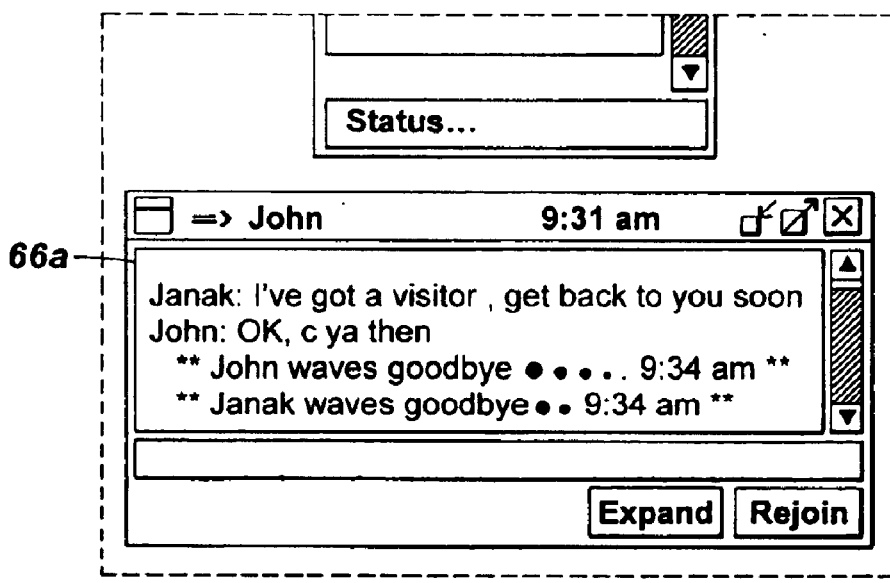
FIG. 10B illustrates the message window of the recipient, and further illustrates a message in the form of a time stamp indicating the disconnection of the communication link with the initiator.

Upon the expiration of the count-down period, the system of the invention disconnects the communication link established between the terminating party and the other parties. The system of the invention further provides visual and/or audio signals confirming the termination of the communication link between the terminating party and the other parties. With reference to FIGS. 10A and 10B, if John allows the count-down period to expire without aborting the initiation of the termination of the communication session, the illustrative embodiment disconnects the communication link established between John and Janak. Upon the disconnection of the communication link, the illustrative embodiment provides a time stamp, e.g., 9:34 am, in both Janak's and John's message windows 66 and 68a to indicate the time at which John's communication with Janak is terminated.

Figure 11:
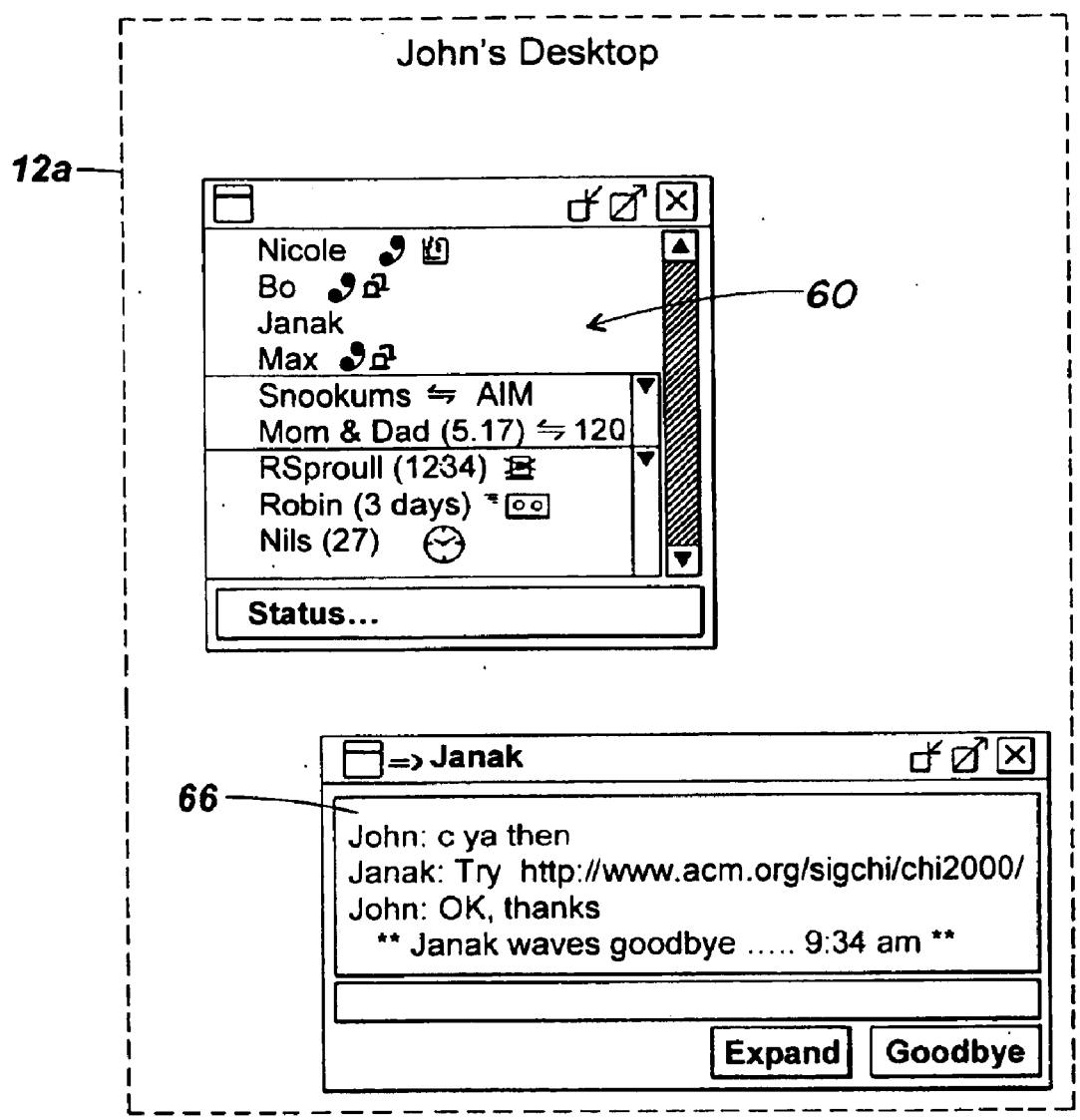
FIG. 11 illustrates the initiator's desktop having a display window and a message window which is open after the disconnection of the communication link with the intended recipient, where the background color of the message window indicates that no communication session is present.

In another aspect, the system of the invention allows a party engaged in a multi-party communication session to keep its message window open even after the departure of the other parties. In such a situation, the system of the invention provides the remaining party with a visual and/or an audio signal, such as the background color of its message window, to remind the remaining party that no communication session exists. As an illustrative example, FIG. 11 illustrates John's desktop 12a after Janak has terminated its participation in a communication session with John. John has, however, kept its message window 66 open after Janak's departure, for example to retrieve a URL that Janak had earlier transmitted. In this illustrative embodiment, the gray color background of John's message window provides a visual signal to John that no communication session with Janak exists. Those skilled in the art will appreciate that other signals, both visual and/or audio, can be employed in the system of the invention to indicate to the remaining party that an active communication session does not exist. For example, one practice of the invention employs a textual message to remind the remaining party that no active communication session exists.

While the present invention has been described with reference to above illustrative embodiments, those skilled in the art will appreciate that various changes in form and detail may be made without departing from the intended scope of the present invention as defined in the appended claims.

What is claimed is:

1. In an electronic device having a communications facility for providing communications among parties, a method for providing information to an initiator regarding availability of an intended recipient to engage in a communication session with the initiator, comprising:

providing the initiator with a visual representation of the intended recipient, said visual representation providing information regarding availability of the intended recipient, and presenting a user interface element to the initiator when said initiator selects the visual representation of the intended recipient, said user interface element providing additional information regarding availability of the intended recipient for engaging in a communication session with the initiator, wherein the step of presenting a user interface element includes the step of choosing said additional information to include an appointment schedule of the intended recipient.

2. In an electronic device having means for creating a communication link among parties, a method for providing information to an intended recipient regarding an initiator's intention to establish a communication session with the intended recipient, comprising:

providing the intended recipient with a visual representation of the initiator, presenting a first user interface element to the intended recipient associated with the representation of the initiator when the initiator initiates establishing a communication link with the intended recipient, said first user interface element informing the intended recipient of the initiator's intention to establish a communication session with the intended recipient, and presenting a second user interface element to the intended recipient upon a request by the intended recipient for information regarding a message that the initiator intends to transmit, said second user interface element providing at least a portion of said message to the intended recipient.

3. The method of claim 2, wherein said electronic device includes a computer and said second user interface element is selected to be a contact preview window.

4. The method of claim 2, wherein the step of providing the intended recipient with a visual representation of the initiator includes the step of selecting said visual representation to be a handle representing the initiator.

5. The method of claim 2, wherein the step of presenting the first user interface element includes the step of selecting said first user interface element to be a graphical element associated with the representation of the initiator.

6. In an electronic device having means for creating a communication link among parties, a method for informing a first party that a second party intends to terminate its participation in a communication session established between said first and second parties, said method comprising the steps of:

providing the first party with a visual representation of the second party, and presenting a user interface element to the first party associated with the representation of the second party upon the second party's initiation to terminate its participation in the communication session, said user interface element informing the first party that the second party intends to terminate its participation in the communication session.

7. The method of claim 6 further comprising the step of providing a count-down period upon the second party's initiation to terminate its participation in the communication session.

8. The method of claim 7 wherein the step of presenting a user interface element includes the step of selecting said user interface element to include a graphical indicator indicating the passage of the count-down period.

9. The method of claim 6, wherein the step of presenting a user interface element includes the step of selecting said user interface element to include a textual message indicating to the first party that the second party intends to terminate its participation in the communication session.

10. A computer system for providing a communication session between an initiator and an intended recipient, comprising a computer being controlled by the intended recipient, means for providing a communication link between the initiator and the intended recipient, a first user interface element associated with said computer to provide the intended recipient with a visual representation of the initiator, a second user interface element associated with the representation of the initiator indicating that the initiator has initiated establishing a communication link with the intended recipient, thereby indicating the initiator's intention to establish a communication session with the intended recipient, and a contact preview window being presented to the intended recipient upon a request by the intended recipient, said contact preview window containing at least a portion of a message the initiator intends to transmit.

11. A computer-readable medium holding computer-executable instructions to be utilized in a computer having a communication facility between first and second parties, comprising:

providing the first party with a visual representation of the second party, presenting a user interface element to the first party associated with the representation of the second party when the second party accesses the communication facility to initiate a communication session with the second party, said user interface element informing the first party of the second party's intention to establish a communication session, and presenting a second user interface element to the intended recipient upon a request by the intended recipient for information regarding a message that the initiator intends to transmit, said second user interface element providing at least a portion of said message to the intended recipient.

12. A computer-readable medium holding computer-executable instructions to be utilized in a computer having a communication facility for providing communication between first and second parties, comprising:

providing the first party with a visual representation of the second party, and presenting a user interface element to the first party associated with the representation of the second party upon the second party's initiation to terminate its participation in a communication session established between the parties, said user interface element informing the first party that the second party intends to terminate its participation in the communication session.

* * * * *